United States Patent Office

2,774,744
Patented Dec. 18, 1956

2,774,744

METHOD OF PREPARING LOW SODA-CONTENT ALUMINA CATALYST

Wayne T. Barrett, Baltimore, Md., and Charles E. Welling, Pittsburgh, Pa., assignors to W. R. Grace & Co., New York, N. Y., a corporation of Connecticut No Drawing. Application November 6, 1950, Serial No. 194,394

16 Claims. (Cl. 252—465)

This invention relates to alumina of high purity and more particularly to a novel method of preparation of an alumina having a low soda content particularly efficient in combination with molybdena and chromia for hydroforming operations.

Aluminas of high purity have long been required for various purposes, and are especially desirable in the preparation of certain catalysts of maximum activity and thermal stability. The desired purity has in the past been obtained by preparing the alumina from pure aluminum salts or from metallic aluminum. The high cost of the raw materials used in the processes heretofore available have caused the cost of alumina of high purity prepared by those processes to be very high. Attempts have been made to prepare an alumina of high purity by removal of the impurities, primarily soda, from low cost raw materials, such as Gibbsite, the ordinary aluminum hydrate of commerce. One method is a leaching process described in United States Patent No. 2,454,724 to Tamele, et al.; however, the method described in that patent is effective only in reducing the soda content to about 0.1%.

It is an object of this invention to provide a new method for the preparation of low soda aluminas from commercial aluminiferous materials.

Another object of this invention is to provide a novel alumina of low soda content suitable as a filler, a pigment, metal polishing aid, etc.

Still another object of this invention is the provision of a thermally stable alumina suitable as a support for catalytic materials and especially hydroforming catalysts.

It is also an object of this invention to provide a process for the preparation of improved hydroforming catalysts.

With these and other objects in view as will become apparent in the following detailed description, the invention resides in a process in which an aluminiferous material is slurried with water and autoclaved in the presence of an acidic material at elevated temperatures for a period sufficient to change the characteristics of the aluminiferous material. By acidic material we mean any material which ionizes in water to give a solution having a pH below 7 while releasing an anion, a basic aluminum salt of which is water soluble, and the term has been used in this sense throughout the specification and claims.

The preferred raw material employed in the preparation of this alumina is the ordinary aluminum hydrate of commerce containing about 0.3 to 1% soda. This material is substantially alpha-alumina trihydrate, the synthetic equivalent in crystal structure and $Al_2O_3/H_2O$ ratio of the naturally occurring substance Gibbsite. For convenience, the term Gibbsite is used herein to designate a material that is substantially alpha-alumina trihydrate, whether of synthetic or natural origin. Other forms of alumina, such as the other hydrates of alumina and their catalytically active dehydrated forms, or mixtures thereof also may be so treated. For example, Boehmite or the anhydrous alumina produced by dehydration of Gibbsite and known in the art as gamma alumina may be treated according to this invention to produce an improved alumina of low soda content. For purposes of illustration, the treatment of Gibbsite to produce the novel low soda content alumina of this invention will be described herein in detail.

Water is added to the Gibbsite to form a slurry. The amount of water employed in the preparation of the slurry is not critical and may vary from as little at 50% to as much as 900% of the Gibbsite without appreciable effect on the final product. A slurry containing about 25% solids has been used most often for the preparation of the novel alumina of this invention because of practical considerations such as convenience in handling and volume of material handled.

The aqueous slurry is then treated in an autoclave at elevated temperatures in liquid phase with acidic materials for periods sufficient to convert the Gibbsite to a form from which the soda may be readily separated from the alumina. In the preferred procedure for the preparation of the novel alumina, the slurry is treated with an acidic material selected from the group consisting of nitric acid, hydrochloric acid, acetic acid, or their aluminum salts, or mixtures of any of them. When alumnium nitrate is employed as the reagent for the treatment of the slurry, a typical charge may have the following composition:

| | Parts by weight |
|---|---|
| $Al_2O_3.3H_2O$ | 100 |
| $Al(NO_3)_3.9H_2O$ | 7.6 |
| Water | 225 |

As in the addition of water to form the slurry, the amount of aluminum nitrate added to the slurry is not critical. The aluminum nitrate may range from as little as .5% up to 50% of the trihydrate and effectively free the soda from the alumina, however the flocculent nature of the product will be influenced by the amount of acidic material used.

If nitric acid is substituted for the aluminum nitrate as a reagent, it may be added in amounts to introduce nitrate ions into the slurry in quantities equivalent to those present when aluminum nitrate is used as the reagent, as described in the preceding paragraph.

The slurry of Gibbsite to which the aluminum nitrate has been added is treated in an autoclave preferably with mild agitation at temperatures above about 350° F., and preferably at a temperature in the vicinity of 600° F. The period of the autoclaving is directly dependent upon the temperature employed. Pressures sufficiently high to maintain the liquid phase are employed in the autoclaving procedure. At 350° F. the slurry must be autoclaved for approximately six hours to obtain the desired conversion, whereas at 600° F. an autoclaving period of five minutes is sufficient. The reaction period at intermediate temperatures will lie betwen the periods set forth, and autoclaving at higher temperature will permit still further reduction in reaction times, although, in general, any further reduction in autoclaving period is not sufficient to be of practical advantage. The reaction will proceed without agitation, but the time required for the conversion will be increased and the conversion to an alumina of low soda content will not be as complete.

The autoclaving procedure may be performed as a batch operation in conventional vessels capable of withstanding the pressure required to maintain the slurry in the liquid phase at the temperature of the autoclaving. Alternatively, a series of vessels provided with means for moving the slurry successively from one autoclave to another may be employed to obtain a continuous autoclaving effect. The autoclaving operation may also be performed continuously in a pipe reactor provided with suitable valves to maintain the liquid under the pressure necessary to keep the slurry in the liquid phase and pumping means to move the slurry continually through the pipe. Preferably, the "pipe autoclave" is equipped with counter-current heat exchangers to accomplish pre-heating and cooling of the slurry.

Following the autoclaving, the slurry is washed by conventional methods such as filtering, re-pulping the precipitate, and then filtering the re-pulped slurry. One washing of the slurry from the autoclave is usually sufficient but in some instances additional washing will be required for the removal of the soda that has been "unlocked" in the autoclaving step. An easily filterable slurry is obtained if the precipitate from the first filtration step is washed with a slightly alkaline wash water and for this reason a wash water having a pH of about 8 is preferred. The autoclaved and washed product of the preferred process is a crystalline material having very small particle size.

The autoclaving and subsequent washing of the slurry results in a marked reduction in the soda content of the Gibbsite from about 0.5% to about 0.05% and even less. The soda content of the final product is an indication of the degree of conversion from the Gibbsite to the novel product of this invention, and, in this connection, it will be noted that the soda content of sample #1 in Table I, below, is little changed from that of the original Gibbsite. Another correlation may be made between the completeness of the reaction in the autoclaving and the conversion of the Gibbsite to Boehmite.

The exact mechanism by which the soda is unlocked to permit its subsequent easy removal from the autoclaved alumina is not completely understood. One possible theory is that a continuous solution and re-precipitation of solid alumina with the formation of a basic soluble alumina compound takes place which incidentally frees the soda which is not again taken up by the alumina on re-precipitation. It is to be understood that the invention is not limited to this possible mechanism which is offered only as a possible explanation of the course followed to release soda from aluminiferous materials autoclaved according to this invention.

Following the washing of the alumina, it is ordinarily dehydrated, for example, by heating at temperatures in the neighborhood of 900° F. The dehydrated material is finely divided and is suitable for use as a filler in the compounding of rubber and plastics, or as an abrasive, polishing agent, etc. The alumina is of principal value as a support for catalytic materials with which the alumina may be impregnated by conventional processes either after dehydration of the washed alumina or prior to dehydration.

As shown in the following examples, the soda content of the final product is materially reduced and catalysts prepared from the novel alumina have a high thermal stability especially noted when used in hydroforming processes.

EXAMPLE I 690 grams of Gibbsite were charged to an autoclave and thereafter 52.4 grams of C. P. aluminum nitrate Al(NO$_3$)$_3$·9H$_2$O plus 1550 grams of distilled water were added. The slurry was then autoclaved for one hour at 392° F. The mixture from the autoclave was diluted, filtered, re-slurried with distilled water, filtered and again re-slurried and filtered. It was then dried at 230° F. and calcined for four hours at 930° F. The final product had a soda content of 0.31%, indicating a very incomplete autoclaving treatment.

EXAMPLE II

The same mixture was charged to the autoclave in the manner set forth in Example I with the exception that the autoclaving was continued for six hours until substantially complete conversion of the Gibbsite to Boehmite. The final product had a soda content of 0.05%.

The alumina prepared as above may be advantageously employed in place of ordinary active alumina in various supported alumina base catalysts. Any of the catalytic active materials conventionally applied may be employed. Thus a few representative catalytic materials are the oxides, chromates, chromites, molybdates, vanadates and sulfides of the metals of the transition series, particularly those belonging to groups 5 through 8 of the periodic system. These catalytic materials may be deposited upon the alumina in concentrations within a range of 0.5% to 50% of the final catalyst. Particularly suitable catalytic materials are the metal oxides and sulfides, especially those exhibiting de-hydrogenating activity, such as molybdena and chromia, which may be deposited on the alumina in concentrations in a range of 2–20% of the final catalyst and preferably between 8 and 12%.

It is also within the scope of this invention to prepare catalysts containing more than one added catalytic material associated with the alumina of our process. A few examples of such multicomponent catalysts are composites of alumina-molybdena-magnesia, alumina-molybdena-zinc oxide, and alumina-chromia-magnesia. The final catalyst may be employed in finely divided form for fluid catalytic processes or as pellets in stationary or moving bed processes. If the catalyst is to be employed in the pelleted form, the pellets may be prepared by the addition of a pelleting aid such as polyvinyl alcohol or graphite to the catalyst and then pilling the catalysts with or without subsequent removal of the pelleting aid.

EXAMPLE III

The calcined product of Example I had stirred into it a solution of ammonium molybdate sufficient to impregnate the alumina with 9% molybdenum on a dry basis and the mixture was then dried at 230° F. and activated for two hours at 1200° F.

EXAMPLE IV

The calcined product of Example II was impregnated with ammonium molybdate to a concentration of 9% molybdena, dried, and activated as described in Example III.

The resulting catalysts were then tested for activity by passing a commercial hydroforming feed containing about 20% aromatics over the materials at 950° F. and 200 pounds per square inch gauge at the rate of 2.2 volumes per volume of catalyst per hour. Hydrogen was added to the liquid feed at a mol ratio of 2.6:1. The catalyst activity is evaluated in terms of the volume of aromatics produced in the test. The catalysts are identified in Table I as Example III, Catalyst A, and Example IV, Catalyst C.

After an initial test for activity, both catalysts were heated six hours at 1550° F. and a second activity test was run. The catalysts of Examples III and IV following the treatment at 1550° F. are designated B and D, respectively, in Table I.

*Table I*

| Catalyst | g. Na$_2$O/ 100 g. Al$_2$O$_3$ | Avg. Vol. Percent Aromatic Hydrocarbons in Liq. Product | | Activity Index [1] |
|---|---|---|---|---|
| | | Fresh Cat. | Calcined Cat. | |
| A | 0.31 | 54 | | 86 |
| B | | | 26 | 0 |
| C | 0.05 | 58 | | 96 |
| D | | | 42 | 50 |

[1] Activity index = $100 \times \dfrac{X-C}{B-C}$ where

X = avg. vol. percent aromatics in liq. product made by catalyst in question
B = avg. vol. percent aromatics in liq. product made by our standard catalyst
C = avg. vol. percent aromatics in liq. product made over an inert catalyst (fused quartz).

A good hydroforming catalyst prepared from the more expensive alumina gel will have a thermal stability such that it has an original activity of 100 and an activity of 50 after calcining for six hours at 1550° F. in the accelerated thermal stability test. This treatment for six hours at 1550° F. constitutes a test of thermal stability which provides an accurate indication of catalyst activity in actual use.

It will be seen from Table I that while the original activity of a catalyst prepared from insufficiently treated Gibbsite has an activity nearly as high as the catalyst of this invention, it is deactivated in the accelerated thermal stability test. On the other hand, the product of this invention has a thermal stability substantially equal to that of good hydroforming catalysts prepared from the same catalytic materials supported on higher priced alumina gels.

EXAMPLE V

A modification of the low soda alumina was prepared by charging 690 grams of commercial aluminum hydrate to an autoclave and mixing and adding thereto 37.6 grams of C. P. concentrated nitric acid, 70% and 1550 grams of distilled water. The slurry was autoclaved for one hour at 450° F. After the usual washing treatment as described in Example I, the soda content was 0.03%. This alumina was then used as a support for an oxidation catalyst by stirring into the dry material a solution of vanadyl sulphate and potassium sulphate in concentrations to give a final product containing 10% $V_2O_5$ and 10% $K_2SO_4$ based on the alumina. The impregnated material was then dried at 250° F. and activated for four hours at 930° F.

EXAMPLE VI

Forms of alumina other than Gibbsite have been treated according to this invention to produce an alumina of low soda content. 25 grams of Gibbsite were heated for two hours at 1022° F. which converted the Gibbsite to an anhydrous form commonly known as gamma alumina. The calcined product was then autoclaved for six hours at 392° F. with 56 grams water and 1.9 grams of alumina nitrate. Following the autoclaving, the slurry was filtered, reslurried and filtered to produce a final product having a soda content of less than 0.01%.

While this invention has been described in detail with respect to a particular modification of the invention, it is to be understood that the concept of this invention is not limited to those details but is determined by the scope of the appended claims.

We claim:

1. A one-step process for reducing the soda content of soda-contaminated crystalline alumina trihydrate to a value below about 0.05% and simultaneously converting the trihydrate to alumina monohydrate, which consists essentially of slurrying the trihydrate with water and an acidic material of the group consisting of nitric acid, hydrochloric acid, acetic acid, the aluminum salts of said acids and mixtures thereof, autoclaving the slurry at a temperature above 350° F. thereby effecting substantially complete conversion to the monohydrate and thereby solubilizing soda as a result of the conversion, and filtering and water washing the thus treated alumina.

2. A one-step process for removing substantially all of the soda from crystalline alumina trihydrate which is contaminated with soda and simultaneously converting the trihydrate to the monohydrate, which consists essentially of slurrying the trihydrate with water and an acidic material of the group consisting of nitric acid, hydrochloric acid, acetic acid, the aluminum salts of said acids and mixtures thereof, autoclaving the slurry at a temperature above 350° F. thereby effecting substantially complete conversion to the monohydrate and thereby solubilizing soda as a result of the conversion, and filtering and water washing the thus treated alumina.

3. A one-step process for reducing the soda content of Gibbsite containing above about 0.3% by weight soda to a value below about 0.05% by weight and simultaneously converting the trihydrate to Boehmite, which consists essentially of slurrying the trihydrate with water and an acidic material of the group consisting of nitric acid, hydrochloric acid, acetic acid, the aluminum salts of said acids and mixtures thereof, autoclaving the slurry at a temperature above 350° F. thereby effecting substantially complete conversion to the monohydrate and thereby solubilizing soda as a result of the conversion, and filtering and water washing the thus treated alumina.

4. A process as defined in claim 1 wherein the crystalline alumina trihydrate is Gibbsite.

5. A process as defined in claim 1 wherein the acidic material is nitric acid.

6. A process as defined in claim 1 wherein the acidic material is acetic acid.

7. A process as defined in claim 1 wherein the acidic material is hydrochloric acid.

8. A process as defined in claim 1 wherein the acidic material is aluminum nitrate.

9. A process as defined in claim 1 wherein the acidic material is aluminum acetate.

10. A process as defined in claim 1 wherein the acidic material is aluminum chloride.

11. A process as defined in claim 2 wherein the crystalline alumina trihydrate is Gibbsite.

12. A process as defined in claim 11 wherein the acidic material is present in amounts ranging from about 0.5 to 50% by weight of the Gibbsite.

13. A process as defined in claim 3 wherein the acidic material is aluminum nitrate.

14. A process according to claim 4 including the steps of impregnating the thus treated alumina with a catalytic material, drying and activating to form a catalyst.

15. A process of preparing a catalyst as defined in claim 14 wherein the catalytic material is selected from the group consisting of metal oxides of Group VI and mixtures thereof.

16. A process as defined in claim 15 wherein the catalytic is molybdenum oxide.

References Cited in the file of this patent

UNITED STATES PATENTS

| | | |
|---|---|---|
| 691,470 | Jordan | Jan. 21, 1902 |
| 1,953,201 | Tosterud | Apr. 2, 1934 |
| 2,180,576 | Baylis et al. | Nov. 21, 1939 |
| 2,378,155 | Newsome et al. | June 12, 1945 |
| 2,390,272 | Reismeyer | Dec. 4, 1945 |
| 2,411,807 | Reismeyer | Nov. 26, 1946 |
| 2,454,724 | Tamele et al. | Nov. 23, 1948 |
| 2,478,675 | Tamele et al. | Aug. 9, 1949 |
| 2,492,808 | Marisic et al. | Dec. 27, 1949 |
| 2,518,295 | Denton et al. | Aug. 8, 1950 |